March 17, 1942.    N. P. HARSHBERGER    2,276,485
COATING METHOD
Original Filed April 29, 1939    2 Sheets-Sheet 1

INVENTOR.
Norman P. Harshberger
BY
ATTORNEY

March 17, 1942. N. P. HARSHBERGER 2,276,485
COATING METHOD
Original Filed April 29, 1939 2 Sheets-Sheet 2
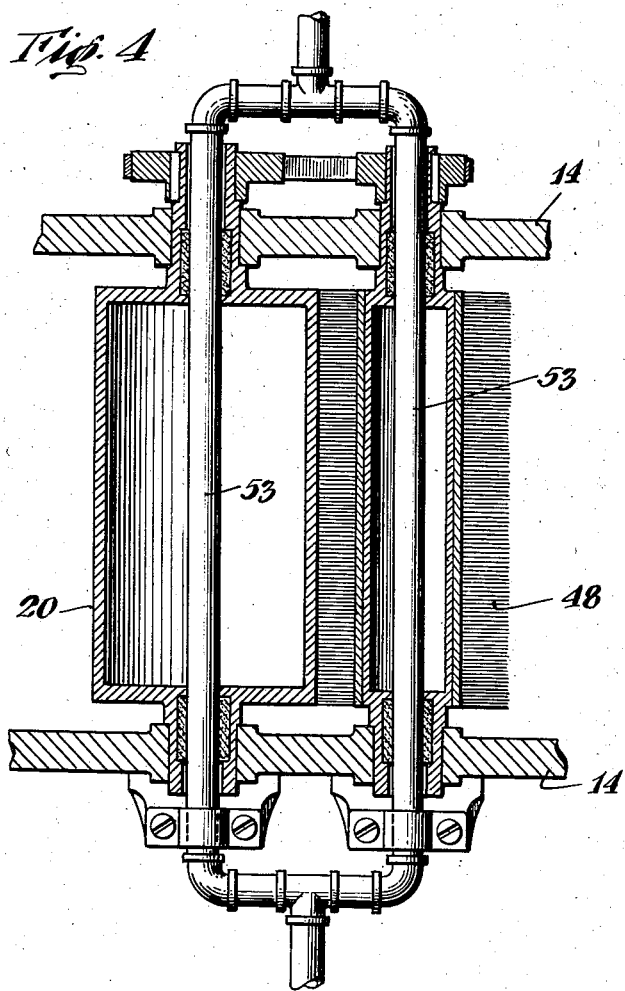
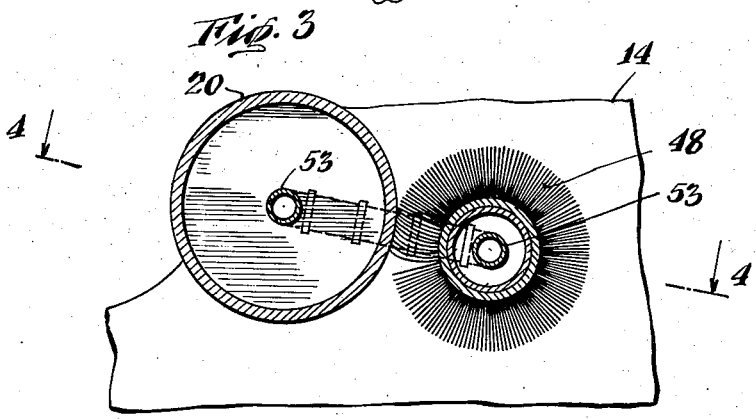
INVENTOR.
Norman P. Harshberger
BY Sidney A. Ochs
ATTORNEY Patented Mar. 17, 1942

2,276,485

UNITED STATES PATENT OFFICE

2,276,485
COATING METHOD

Norman P. Harshberger, Old Greenwich, Conn., assignor to Carbide and Carbon Chemicals Corporation, New York, N. Y., a corporation of New York Original application April 29, 1939, Serial No. 270,729. Divided and this application May 27, 1941, Serial No. 395,373

16 Claims. (Cl. 91—68)

This invention relates to methods for producing coating compositions comprising particulate materials and a wetting agent, and more particularly for producing hydrated coating compositions of argillaceous cementitious materials. The invention also relates to methods for producing individually coated particles; for instance, roofing granules. More specifically, the invention relates to a method for making cement coated roofing and siding; for instance, of the type disclosed in my Patent No. 1,913,667, granted June 13, 1933, wherein there is disclosed a felted fibrous base saturated and coated with a bitumen such as asphalt, and surfaced with a layer of granular particles, to which has been applied over the granule surfaced side a continuous layer of a cement composition.

The present invention is a division of my copending application, Serial No. 270,729, filed April 29, 1939, and is a continuation-in-part of my copending application Serial No. 26,770, filed June 15, 1935, now Patent 2,156,286.

In said prior application, Serial No. 26,770, I have disclosed, among other features, complete methods for producing plastic or sludgy coatings comprising a particulate material, for instance, cement, on a moving surface, and which comprises, in part, steps for handling, feeding, and distributing the coating material. Since the present invention is particularly directed to certain novel steps of the complete operations disclosed in said prior application, the descriptive matter here presented will be substantially limited thereto. It will be understood, however, that the present methods may be used in conjunction with or apart from the complete method of said prior application, and the use of any and all features disclosed in said prior application in conjunction with the present invention is fully contemplated. For example, it will readily be discernible that the present method may be substituted for certain other feeding and distributing steps of the prior application for obtaining coatings on base material.

In the formation of coatings with particulate material and a liquid; for instance, a hydraulic cement and water, it is desirable to effect a controlled water-cement ratio. It is also desirable that all the cementitious materials receive similar proportions of the added water and that the water density be as uniform as possible during coating operations. This is not always possible with large batch mixing of the ingredients as the water distribution does not remain uniform unless there is constant agitation. It is particularly important where thin coatings of a cementitious composition are to be formed or applied. Moreover, certain cements have quick setting or even flash setting characteristics, and batch mixing operations leave very little, if any, time to utilize the wetted material. Furthermore, in handling many soluble particulate materials; for instance, powdered resins, and a solvent; for instance, mineral spirits, the latter readily evaporates, and unless used in excess may not be present in sufficient amount at the time of use. Solvents are also costly and require various precautions when used in large quantities. The use of a minimum amount of solvent is therefore usually desirable.

The present invention provides a method for overcoming the undesirable features of batch mixing for applications of the character described, which are, of course, merely illustrative. In particular, the invention provides a method of controlled combination of the wet and dry ingredients and application of the wetted composition in a short interval of time after the components of the mixture have been brought together. The present invention also provides a method for coating particulate materials; in particular, with a fluid coating substance. It will be understood that the invention may be used with other compositions requiring the addition of measured amounts of a liquid.

An object of the invention is to provide a method for adding measured quantities of a wetting agent; for instance, a fluid or a liquid, to particulate compositions.

Another object is to provide a method for bringing together measured quantities of a particulate substance and a liquid, and to form one or more layers of the composition in a short interval of time after the ingredients are combined.

A particular object of the invention is to provide a method for controlling the water addition to argillaceous cement compositions; for instance, a hydraulic cement composition.

Another object is to provide a method for feeding measured amounts of solid particulate substances and a liquid from separate sources of supply, and bringing the two together to produce a wetted plastic composition for application to a receiving surface.

A further object is to provide a method for continuously forming a layer of plastic composition, comprising continuously combining measured amounts of liquid and particulate substances to form the same and transferring the resultant plastic composition layer to a receiving surface to form another layer thereon.

Another object is to provide a process for forming plastic layers on a base, which comprises continuously adding measured quantities of a wetting agent to a particulate substance while the latter is being fed, to produce an instantaneous plastic mixture, and then forming a layer of the fed material upon a base which may be moving.

Another object of the invention comprises the provision of a method for continuously bringing together, upon a collection surface, superposed measured quantities of a particulate composition and a liquid to form a plastic or sludgy mass, and forcibly impelling the wetted mass against a receiving surface, which may also be moving, the said receiving surface being, for example, a web or blank of mineral surfaced asphalt roofing, to which the wetted composition will become bonded upon drying.

A specific object of the invention is to form a measured layer of wetting agent of a fluid or liquid nature upon a moving surface, then adding to said layer a layer of finely divided particles of a cementitious material to form on said moving surface a plastic layer of the combined materials, and subsequently impelling particles of said plastic layer upon a base material to coat the same.

These and other objects of the invention will, in part, be understood, and, in part, be more specifically pointed out in the following description and in the claims taken in conjunction with the accompanying drawings, wherein Fig. 1 is a sectional elevation illustrating apparatus for carrying out the invention;

Fig. 3 is an enlarged view, partly in section, of the collection roll and impeller of Fig. 2 embodying means to heat these members; and Fig. 4 is a longitudinal section taken on 4—4 of Fig. 2.

Figure 2:
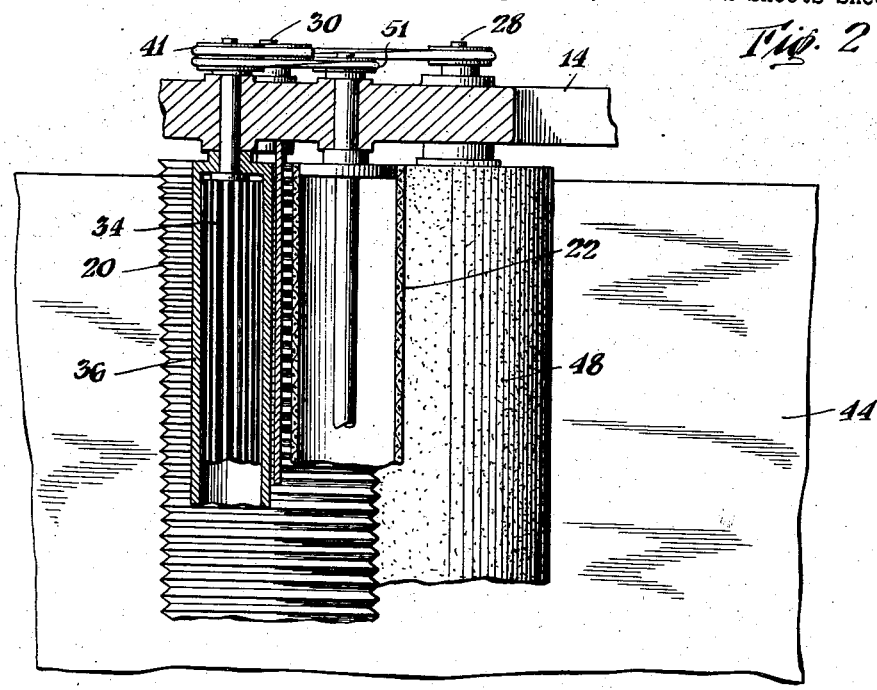
Fig. 2 is a broken section view taken at 2—2 of Fig. 1.
Figure 1:
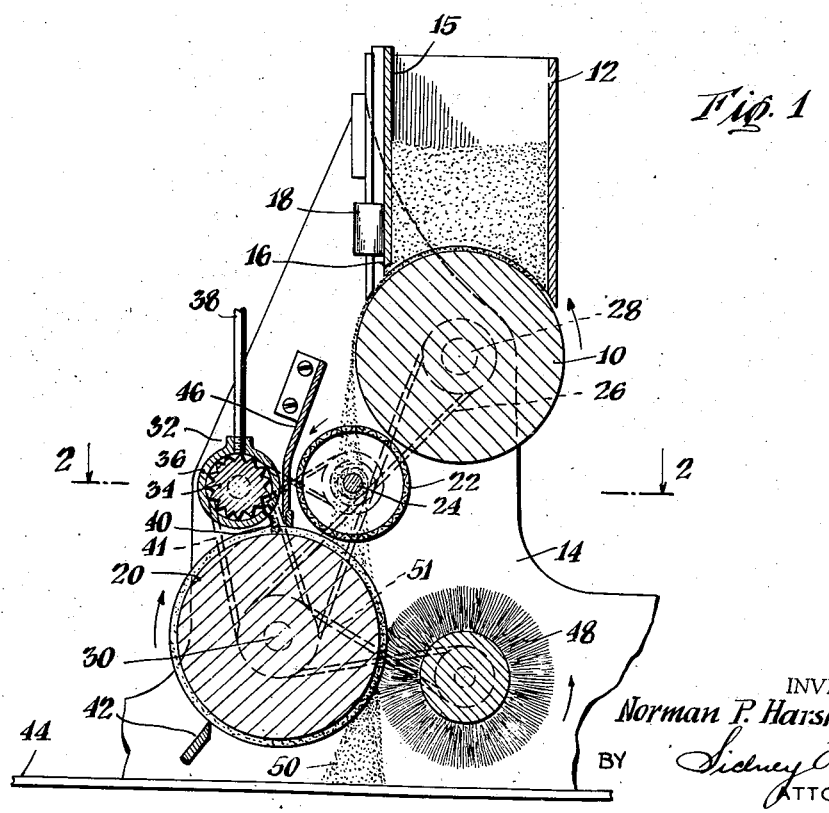

Referring to Figs. 1 and 2, which will be described for the purpose of illustration with respect to apparatus for particular use with a hydraulic cement material, 10 is a feed roll forming the bottom of a hopper 12. The feed roll may have a smooth or grooved surface of the character described in my prior application, the particular surface condition being selected for the type of material which is to be fed. The roll 10 is suitably supported in opposite bearings of a frame 14 illustrated in part in Fig. 2. The top of the hopper 12 is open to receive a supply of the particulate composition and the bottom thereof is closed by the surface of the roll 10. The hopper may have an adjustable gate 15, suitably supported between the end walls of the hopper and adapted to be adjusted up and down to obtain a predetermined spacing between the surface of the roll 10 and the lower edge 16 of the hopper gate. In this manner, the quantity of particulate composition fed by the roll 10 may readily be controlled. The gate may be vibrated, if desired, by a suitable vibrator 18 such as an electrical vibrator of known variety.

The particulate composition fed by the roll 10 may be deposited directly upon a collecting member; for instance, a roll 20 but preferably falls upon a spreading device 22 when the particulate material is a powder-like substance like Portland cement (100–200 mesh). The device 22 may be a rotating screen of suitable mesh mounted between hubs on a shaft 24, and driven in any suitable manner at a proper peripheral speed in suitable relation to the linear speed of the roll 10. The roll 10 may be driven by means of a belt 26 through suitable pulleys secured to the feed roll shaft 28 and collection roll shaft 30 respectively.

The particulate material falls within the screen and is spread and sifted in a stream by the spreader 22 upon the surface of the collection roll 20, which may have a plain or grooved surface similar to that of the feed roll 10. In the drawings, the roll 20 is illustrated as having a grooved surface formed by a plurality of threads of suitable pitch.

Positioned in suitable relation to the collection roll 20 is a feed mechanism 32, which is adapted to feed the wetting agent; for instance, a fluid or liquid to the surface of the collection roll 20, preferably forming a thin, continuous and uniform layer thereon for combining with the particulate substance. This mechanism may, for example, comprise a driven fluted roll 34 rotating in a water tight housing 36, which is fed with the wetting agent from a suitable inlet; for instance, a pipe 38, and discharges through an opening 40 at the lower side of the housing on to the roll 20. The roll 34 is driven by suitable means; for instance, a belt 41 through pulleys on the shaft 30 of the collection roll 20 and on that of the roll 34. The quantity of liquid that is fed to the roll 20 is determined by the speed of rotation of the fluted member 34, and by the configuration of its surface. It will be understood that the opening 40 may be continuous over the length of the roll 20, or may constitute a series of perforations along the housing 36 adapted to uniformly wet the surface of the roll 20. A wiper 42 with suitable collection means may be provided to prevent the agent from following the surface of the roll 20 and dripping on to the receiving surface, which may; for instance, be a moving web or belt 44 that is positioned immediately below the roll 20. In order to prevent the particulate material from becoming prematurely wetted by splashing or otherwise, a suitable shield 46 is provided between the fluid feeding mechanism 32 and the spreading device 22, this being supported between the side frames 14. The lower end of the shield 46 may be provided with a wiper adapted where desired, to measure the film of liquid fed by the surface of the roll 20.

The moving layer of wetting agent is combined with the particulate material immediately below the spreader 22 and the wetted composition is subsequently removed in whole or part by a rotary distributor 48, preferably an impeller of bristle type that impels the wetted composition in a stream 50 of particle form on to the receiving surface 44. The impeller preferably does not rotate in contact with the surface 44. The point of removal of the composition is preferably as close as possible to the receiving surface so that where a bond is desired to a base material; for instance, a thermoplastic substance like bitumen, carried thereby, or of which it may be constituted, such bond will be of a satisfactory nature. The impeller 48 may also be driven through suitable pulleys by a belt 51 from the shaft 30 of the collection roll 20. The diameter of the roll 20 will generally be selected for the type of material being fed, so that a proper time interval may be provided between the moment of combining the particulate material with the wetting agent and the moment when it is removed for distribution. In the case of a hydraulic cement, the time element may be very short. In the case of certain materials which are combined with solvents, it may be desirable to permit the solvent to act slightly upon the particulate substance to make it somewhat adhesive before applying the mixture to the receiving surface 44. The entire mechanism may be driven by suitable means through the shaft 30 of the roll 20. Where a dust condition occurs because of feeding a finely divided dry solid substance, the entire mechanism or dry particle feeding elements may be fully enclosed.

In certain instances where hot or congealable wetting agents, for instance hot asphalt, are to be fed to the roll 20, suitable heating means, such as steam pipes 53 (Figs. 3 and 4), may be provided to heat the roll 20 and impeller 48 and thereby keep the wetting agent hot or prevent its congealing. The roll 20 and impeller 48 are then preferably made of metal so as to readily conduct heat received from the steam pipes 53. The layer of heated wetting agent may be spread by the member 46 (Fig. 1) to a smooth coating of predetermined thickness. If desired, a hood, not shown, may be provided over the roll 20 and impeller 48 or any portion thereof to conserve the heat. Moreover, additional heating means, such as a blower or a heating element and reflector may be provided to direct heat to the area of contact of the roll and impeller.

As an example of one method of utilizing the described embodiment of the invention, the hopper 12 may be provided with a dry hydraulic cement composition comprising finely divided particles. A measured layer of the cement will be fed by the roll 10, preferably moving in a counter-clockwise direction, and the particles thereof will drop or be caused to fall upon the spreader 22, which in turn will spread and sift the particles in a thin layer over the surface of the roll 20 which carries a measured film or layer of water, the water having previously been deposited by means of the liquid distributor 32. The cement composition is hydrated and becomes plastic upon contact with the wet surface of the roll 20 and is adapted to set when impelled upon the receiving surface 44, which may be, as previously stated, a web of mineral surfaced roofing material. While on the roll 20, continuous increments of the composite layer are beaten by impeller 48 to facilitate comingling of the particulate material and the wetting agent.

The described invention is particularly useful with quick setting or flash setting cements, as the water may be applied or fed to the cement at the time of use or within a safe time interval prior thereto. The described invention also permits the quantity of wetting agent and consistency of the wetted mass to be maintained substantially constant for extended periods. It will also be readily understood that it is particularly useful where the wetting agent is a solvent, as it prevents loss through evaporation and provides a means of controlling the amount that is supplied.

It will be understood that various wetting agents may be used with the described invention; for example, water, solvents, such as mineral spirits, alcohol or toluol, coating materials, such as varnishes; for instance, natural or phenolic resins in a solvent, water emulsions of bitumen or resins, hot asphalt, silicate of soda. Also, that various particulate materials may be fed; for example, hydraulic cement, gypsum, casein, ground resin moulding powders, mica, metal particles; for instance, aluminum flakes.

The disclosed method is also useful for applying coatings to granules; for instance, to produce roofing granules or the like. The granules to be coated; for instance, of a size between 8-11 mesh may be supplied from the hopper 22 and the coating material may be applied to the surface of the roll 20 through the liquid dispensing device 32, or any other suitable feed means. The granules will become coated with the coating substance upon contact with the layer or film thereof, and will be completely coated by the spinning action it is believed the granules receive when they are impelled by the distributor 48 upon the collection surface 44 following which the coatings may be dried or hardened in any suitable manner. In an operation of this character, it is contemplated that the speed of rotation of the impeller 48 and the extent of wipe of the bristles thereof upon the coated particle cores will be adjusted to create a suitable spinning action of the particles to obtain the desired extent of coating. The coated particles upon collecting upon the surface 44, which may be moving, may be kept in vibration by suitable mechanism until they have substantially dried and are in a condition for removal by other desired means.

From the above description, it will be apparent that I have provided novel methods for feeding mixtures of particulate material and wetting or coating agents, and also for coating particulate material with a continuous film of such agent. The disclosed embodiment has been set forth for the purpose of illustration only. It will be understood that many changes may be made and will suggest themselves to those skilled in the art without departing from the spirit and scope of my invention, which is only to be limited in accordance with the following claims when taken in conjunction with the prior art.

I claim:

1. In the method of treating particulate material with a wetting agent, the improvement comprising feeding a wetting agent and a particulate material from separate sources of supply, forming a layer having said wetting agent and particulate material combined in superposed relation, and beating continuous increments of said composite layer.

2. In the method of treating particulate material with a substantially liquid wetting agent, the improvement comprising moving a layer of said agent relative to a stream of particulate material, superposing a multiplicity of pieces of said particulate material upon said layer and beating continuous increments of said composite layer.

3. In the method of treating particulate material to form a plastic composition, the improvement which comprises withdrawing from separate sources of supply measured quantities of wetting agent and substantially dry particulate substance adapted to produce a plastic with said agent and forming a plastic mass of superimposed applications of said agent and particulate substance.

4. The method of treating particulate material with a wetting agent comprising forming a layer of a substantially liquid wetting agent, adding solid particulate material to said layer of wetting agent, beating the composite layer to facilitate commingling of said particulate material and wetting agent, and depositing the coated particulate material upon a receiving surface.

5. The method of treating particulate material with a wetting agent comprising withdrawing from separate sources of supply a wetting agent and a particulate material, forming a thin layer of said wetting agent, spreading a plurality of pieces of said particulate material over said layer, subjecting the pieces of particulate material of said layer to a spinning action to substantially coat them with a continuous film of said agent and projecting the coated pieces upon a receiving surface.

6. The method of treating particulate material to form a plastic composition and applying the composition to a receiving surface, comprising withdrawing from separate sources of supply measured quantities of wetting agent and substantially dry particulate material adapted to produce a plastic composition with said agent, forming a layer of superimposed applications of said agent and material, beating continuous increments of said layer and projecting a stream of plastic particles of said beaten portion upon a receiving surface.

7. The method of treating particulate material to form a plastic composition and applying the composition to a receiving surface comprising forming a layer of a wetting agent, adding to said layer a particulate material adapted to form a plastic with said wetting agent, beating said composite layer a portion at a time to facilitate commingling of said agent and material and projecting a stream of plastic particles of said beaten portion upon a receiving surface.

8. The method of treating particulate material to form a plastic composition and applying the composition to a receiving surface, comprising forming a measured layer of liquid solvent, spreading over said layer of solvent particulate stock substantially soluble in said solvent, beating said layer a portion at a time to facilitate commingling of said solvent and particulate stock and projecting a stream of plastic particles of said beaten portion upon a receiving surface.

9. The method of treating particulate material to form a plastic composition and applying the composition to a receiving surface, comprising withdrawing from separate sources of supply measured quantities of wetting agent and a substantially dry particulate resin substantially soluble in said wetting agent, forming a layer of superimposed applications of said wetting agent and particulate resin, beating said layer a portion at a time to facilitate commingling of said agent and resin and projecting a particle stream of said beaten portion upon a receiving surface.

10. The method of treating particulate material to form a plastic composition and applying composition to a receiving surface comprising withdrawing from separate sources of supply measured quantities of water and substantially dry pulverulent argillaceous cement adapted to be hydrated by said water and form a settable plastic mass, forming a layer of superimposed applications of said water and pulverulent cement, beating said composite layer a portion at a time to facilitate commingling of said water and cementitious particles and projecting a stream of plastic particles of said beaten portion upon a receiving surface.

11. The method of treating particulate material to form a plastic composition and applying the composition to a receiving surface comprising withdrawing from separate sources of supply measured quantities of wetting agent and substantially dry particulate stock adapted to produce a plastic with said agent, forming a layer of superimposed applications of said agent and stock, beating said layer a portion at a time after said stock has been rendered at least partially plastic by said agent and impelling a particle stream of said beaten portion upon a receiving surface.

12. The method of treating particulate material to form a plastic composition and applying the composition to a receiving surface comprising continuously withdrawing from separate sources of supply measured quantities of a wetting agent and substantially dry particulate stock, continuously forming a thin layer of said wetting agent, substantially continuously adding particulate stock to said layer of wetting agent, substantially continuously moving said composite layer to a distributing position, substantially continuously beating said layer a portion at a time to facilitate commingling of said agent and said particulate stock and substantially continuously impelling the commingled material upon a receiving surface.

13. The method of treating particulate material and coating base material therewith, comprising feeding a layer of wetting agent to a distributing position, feeding substantially dry particulate material and sifting said particulate material upon said layer of wetting agent in advance of said distributing position, coating the pieces of particulate material with the wetting agent of said layer and impelling the coated pieces upon a base material moving with respect thereto to form a surfacing thereon.

14. The method of treating particulate material to form a plastic composition and applying the composition to a receiving surface comprising withdrawing from separate sources of supply measured quantities of wetting agent and substantially dry particulate material adapted to produce a plastic with said agent, forming a thin layer of said wetting agent, applying over said thin layer of wetting agent a thin layer of said particulate material, beating continuous increments of said composite layer to facilitate commingling of said agent and stock and projecting a stream of plastic particles of said composite layer upon a receiving surface.

15. The method of treating particulate material comprising withdrawing from separate sources of supply a liquid wetting agent and a particulate material, forming a thin layer of said agent, spreading a plurality of pieces of said particulate material over said layer, subjecting the pieces of particulate material of said layer to a spinning action to substantially coat them with a continuous film of said agent, projecting the coated pieces upon a receiving surface and agitating said pieces until their coatings have substantially dried.

16. The method of treating particulate material comprising forming a measured layer of a hot congealable substance, superposing upon said layer a multiplicity of pieces of particulate material, beating continuous increments of said composite layer to facilitate commingling of said congealable substance and particulate material and impelling a stream of said beaten material upon a receiving surface.

NORMAN P. HARSHBERGER.